(12) United States Patent
Fukuzawa et al.

(10) Patent No.: US 12,191,909 B2
(45) Date of Patent: Jan. 7, 2025

(54) TRANSMISSION DEVICE, INFORMATION TERMINAL, COMMUNICATION SYSTEM, AND COMMUNICATION METHOD

(71) Applicant: TDK CORPORATION, Tokyo (JP)

(72) Inventors: Hideaki Fukuzawa, Tokyo (JP); Takashi Kikukawa, Tokyo (JP); Masahiro Shinkai, Tokyo (JP); Hiroki Hara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/409,171

(22) Filed: Aug. 23, 2021

(65) Prior Publication Data
US 2022/0060260 A1 Feb. 24, 2022

(30) Foreign Application Priority Data
Aug. 24, 2020 (JP) .................... 2020-141197

(51) Int. Cl.
*H04B 10/50* (2013.01)
*H04B 10/116* (2013.01)
*H04B 10/516* (2013.01)

(52) U.S. Cl.
CPC ......... *H04B 10/503* (2013.01); *H04B 10/116* (2013.01); *H04B 10/516* (2013.01)

(58) Field of Classification Search
CPC ... H04B 10/503; H04B 10/116; H04B 10/516
See application file for complete search history.

(56) References Cited

U.S. PATENT DOCUMENTS

| | | | | |
|---|---|---|---|---|
| 9,240,854 B2* | 1/2016 | Mukai | ................. | H04J 14/0221 |
| 10,158,626 B1* | 12/2018 | Ji | ......................... | G06F 3/0685 |
| 2001/0040713 A1 | 11/2001 | Haruyama | | |
| 2010/0021124 A1* | 1/2010 | Koos | ..................... | G02F 1/0316 |
| | | | | 385/141 |
| 2010/0135673 A1* | 6/2010 | Son | .................... | H04B 10/1149 |
| | | | | 398/183 |
| 2011/0033181 A1* | 2/2011 | Jang | .................. | H04B 10/1149 |
| | | | | 398/43 |

(Continued)

FOREIGN PATENT DOCUMENTS

| | | |
|---|---|---|
| CN | 104218999 A | 12/2014 |
| JP | H07-064034 A | 3/1995 |

(Continued)

OTHER PUBLICATIONS

Poonam Devi, "External Modulation Using MZM for Visible Wavelengths", Apr. 10, 2019, Springer Link, All Pages (Year: 2019).*

(Continued)

*Primary Examiner* — Pranesh K Barua
(74) *Attorney, Agent, or Firm* — Oliff PLC

(57) ABSTRACT

A transmission device of the present disclosure is a transmission device that transmits a visible light signal to a receiving device, and includes a laser light source configured to emit visible light, and an optical modulator configured to change intensity of the visible light and generate a visible light signal, in which the optical modulator has an optical waveguide that serves as a transmission path for the visible light, and the optical waveguide is formed of a material containing lithium niobate.

12 Claims, 10 Drawing Sheets

(56) References Cited

U.S. PATENT DOCUMENTS

| | | | |
|---|---|---|---|
| 2017/0052424 A1 | 2/2017 | Iwatsuka et al. | |
| 2018/0083701 A1* | 3/2018 | Tilaye | H04B 10/116 |
| 2019/0079366 A1* | 3/2019 | Iwatsuka | G02B 6/122 |

FOREIGN PATENT DOCUMENTS

| | | | |
|---|---|---|---|
| JP | 2001-292107 A | | 10/2001 |
| JP | 2011-077849 A | | 4/2011 |
| JP | 2011-199533 A | | 10/2011 |
| JP | 2014142411 A | * | 8/2014 |
| JP | 2017-129834 A | | 7/2017 |

OTHER PUBLICATIONS

Reinhard Geiss, "Fabrication of free-standing lithium niobate nanowaveguides down to 50nm in width", 2016, All pages (Year: 2016).*

Reinhard Geiss, "Fabrication of nanoscale lithium niobate waveguides for second-harmonic generation", 2015, Optica Publishing group, All pages (Year: 2015).*

Ed L. Wooten et al., "A Review of Lithium Niobate Modulators for Fiber-Optic Communications Systems," IEEE Journal of Selected Topics in Quantum Electronics, vol. 6, No. 1, 2000, pp. 69-82.

* cited by examiner

TRANSMISSION DEVICE, INFORMATION TERMINAL, COMMUNICATION SYSTEM, AND COMMUNICATION METHOD

BACKGROUND OF THE INVENTION

Field of the Invention

The present disclosure relates to a transmission device, an information terminal, a communication system, and a communication method.

Priority is claimed on Japanese Patent Application No. 2020-141197, filed Aug. 24, 2020, the content of which is incorporated herein by reference.

Description of Related Art

As an optical communication system, a system in which a transmission device transmits an optical signal obtained by adding information data to light, and a receiving device converts the optical signal into an electrical signal to extract information data that cannot be converted into light is known. As a method of adding information data to light, a method of turning on or off a light source of light (direct modulation) and a method of adding a signal from the outside to light propagating in a waveguide to modulate the light (external modulation) are known.

Near-infrared light is widely used in optical communication system, but recently, the use of visible light has been considered. Optical communication systems using visible light are attracting attention because of advantages that a path of optical signals can be seen and a communication range can be seen at a glance. For near-infrared light with a wavelength of 1.5 μm or 1.3 μm, external modulation is used to generate near-infrared light signals (E. L. Wooten et al, 'A review of lithium niobate modulators for fiber-optic communications systems,' IEEE Journal of Selected Topics in Quantum Electronics 6,69,2000). However, since a waveguide for infrared rays has a low propagation efficiency for visible light, it is difficult to generate a visible light signal by direct modulation. For this reason, in a visible light communication system using visible light, it has been considered to use an LED element (light emitting diode element) as a visible light source and generate a visible light signal by using direct modulation.

FIG. 1 is a conceptual diagram which describes a transmission device that generates a visible light signal using direct modulation and a visible light signal generated by the transmission device. As shown in FIG. 1, a transmission device 110 generates a visible light signal using a bright light $1a$ occurring when the visible light source 111 is turned on and a dark light $1b$ occurring when the visible light source 111 is turned off. In order to increase a transmission speed of the visible light signal, it is necessary to shorten an interval between the bright light $1a$ and the dark light $1b$ of the visible light signal, that is, to shorten an on/off switching time of the visible light source 111. However, there is a limit to shortening the on/off switching time of the visible light source 111. For this reason, it has been considered to increase the transmission speed of visible light signals by increasing the number of visible light sources.

For example, Japanese Unexamined Patent Application, First Publication No. 2001-292107 discloses a visible light communication system in which LED elements are arranged in an array in the transmission device, light receiving elements are arranged in an array in the receiving device, and serial data can be transmitted or received as parallel data. According to this Patent Literature 1, if information can be transmitted from one LED element at a speed of 25 Mbps, this is equivalent to that information light equivalent to 400 Mbps can be transmitted from all 16 LED elements, and can be fully applied to high-speed optical communication.

SUMMARY OF THE INVENTION

With an increase in the processing speed of computers and an accompanying improvement in the processing capacity of information data, it is desired that the communication speed be further increased in the optical communication system. However, in a transmission device that generates a visible light signal by direct modulation, there is a limit to shortening the on/off switching time of the visible light source, and it is difficult to increase the generation speed of the visible light signal. Moreover, as described in Japanese Unexamined Patent Application, First Publication No. 2001-292107, when the visible light sources are arranged in an array, it may be difficult to be used for, for example, a small information terminal such as a smartphone because the size of a device becomes large. In addition, if the visible light sources are arranged in an array, data processing may be complicated. Furthermore, as easily expected without any explanation, the use of multiple laser light to increase data speed becomes very expensive. Such configuration is not realistic for consumer use application.

The present disclosure has been made in consideration of such circumstances, and an object of the present disclosure is to provide a transmission device having a configuration in which a visible light signal is generated quickly and a decrease both in size and cost can be easily performed. In addition, another object of the present disclosure is to provide an information terminal using the transmission device described above, a communication system, and a communication method using the communication system.

As a result of studies to solve the problems described above, the present inventor has found that it is possible to make visible light efficiently propagate in an optical waveguide by using laser light as the visible light and lithium niobate as the material of the optical waveguide. Furthermore, the present inventor has found that the generation speed of the visible light signal can be increased by causing the visible light propagated in the optical waveguide including the lithium niobate to be modulated. Therefore, the present disclosure provides the following means for solving the problems described above.

[1] A transmission device is a transmission that transmits a visible light signal to a receiving device, and includes a laser light source configured to emit visible light, and an optical modulator configured to change an intensity of the visible light and generate a visible light signal, in which the optical modulator has an optical waveguide that serves as a transmission path for the visible light, and the optical waveguide is formed of a material containing lithium niobate.

[2] In the transmission device according to [1] described above, a wavelength of the visible light is within a range of 380 nm or more and 780 nm or less.

[3] In the transmission device according to [1] or [2] described above, the optical modulator has a substrate, and the optical waveguide is a lithium niobate film grown on the substrate.

[4] In the transmission device according to [3] described above, the substrate is a sapphire substrate or an aluminum oxide substrate.

[5] In the transmission device according to any one of [1] to [4] described above, a width of a cross section perpendicular to a transmission direction of the visible light in the optical waveguide is within a range of 510.4 nm or more and 1182.5 nm or less, and a height of the cross section is within a range of 510.4 nm or more and 709.5 nm or less.

[6] In the transmission device according to any one of [1] to [5] described above, when a width of a cross section perpendicular to a transmission direction of the visible light in the optical waveguide is set to W nm, a height of the cross section is set to H nm, and a wavelength of the visible light emitted from the laser light source is set to A nm, at least one of the following equations is satisfied.

$$(0.8 \times A) \leq W \leq (2.5 \times A) \quad (1):$$

$$(0.8 \times A) \leq H \leq (1.5 \times A) \quad (2):$$

[7] The transmission device according to any one of [1] to [6] described above further includes an exit port for emitting the visible light signal to an outside.

[8] The transmission device according to any one of [1] to [6] described above further includes a connection unit for connecting to an optical fiber that transmits the visible light signal to the outside.

[9] An information terminal includes a transmission device according to any one of [1] to [8] described above.

[10] In the information terminal according to [9] described above, the information terminal is a smartphone, a tablet, or a personal computer.

[11] A communication system includes the transmission device according to any one of [1] to [8] described above, and a receiving device configured to receive a visible light signal transmitted by the transmission device.

[12] A communication method using the communication system according to [11] described above includes the steps of generating a first visible light signal including a reception permission signal and a second visible light signal including information data using the optical modulator, and irradiating the receiving device with the first visible light signal and the second visible light signal by the transmission device, receiving the first visible light signal by the receiving device, and a process of determining whether to accept the reception permission signal or not, and receiving the second visible light signal by the receiving device when the reception permission signal is accepted.

According to the present disclosure, it is possible to provide a transmission device having a configuration in which a visible light signal is generated at a high speed and can be easily decreased in size. In addition, according to the present disclosure, it is possible to provide an information terminal using the transmission device described above, a communication system, and a communication method using the communication system.

DETAILED DESCRIPTION OF THE INVENTION

Figure 1:
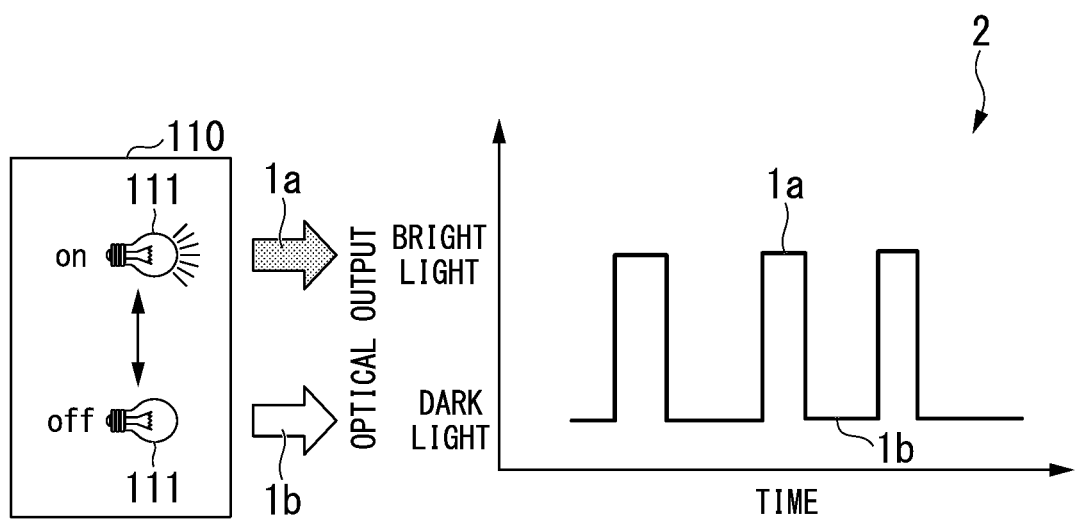
FIG. 1 is a conceptual diagram which describes a transmission device that generates a visible light signal using a direct modulation and a visible light signal generated by the transmission device.

Hereinafter, embodiments of the present disclosure will be described with reference to the drawings. In each of the following embodiments, components that are the same or equivalent to each other may be denoted by the same reference numerals in the drawings, and duplicate descriptions thereof will be omitted or simplified. In addition, in the drawings used in the following description, a characteristic portion may be enlarged and shown for convenience to make the characteristic easy to understand, and dimensional ratios of each component does not have to be the same as actual ones. Moreover, materials, dimensions, and the like exemplified in the following description are examples, and the present disclosure is not limited thereto, and can be appropriately modified and implemented within a range in which the effects of the present disclosure are exhibited. A configuration shown in one embodiment can also be applied to other embodiments.

First Embodiment

Figure 2:
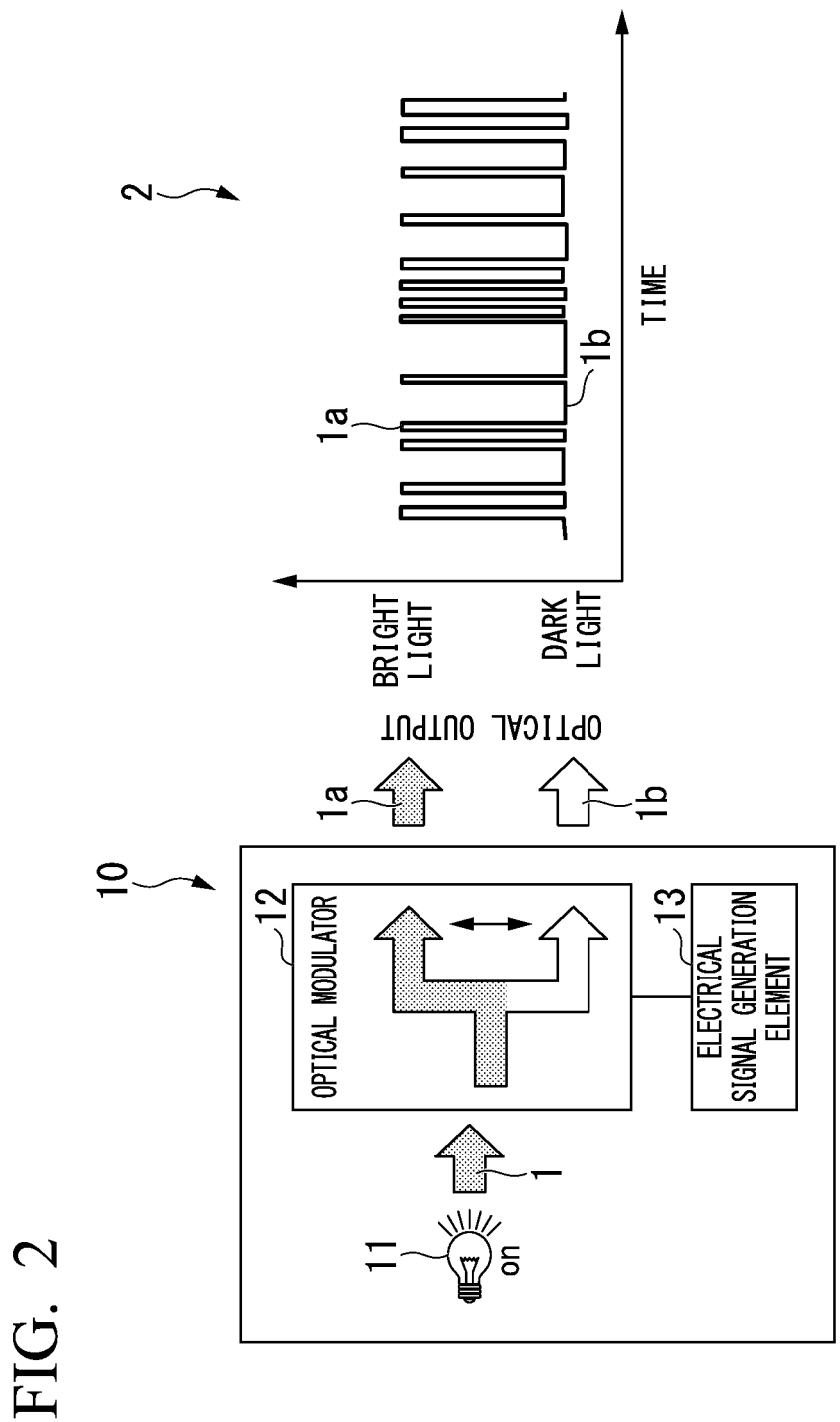
FIG. 2 is a conceptual diagram which describes a transmission device according to a first embodiment of the present disclosure and a visible light signal generated by the transmission device.

FIG. 2 is a conceptual diagram which describes a transmission device according to a first embodiment of the present disclosure and a visible light signal generated by the transmission device. The transmission device according to the present embodiment is a transmission device that transmits a visible light signal to a receiving device.

As shown in FIG. 2, a transmission device 10 according to the present embodiment includes a laser light source 11, an optical modulator 12, and an electrical signal generation element 13.

The laser light source 11 emits a visible light 1. The laser light source 11 is continuously turned on. Note that "continuous" means that the laser light source 11 is in an on state during a period in which a visible light signal is transmitted to the receiving device.

A wavelength of the visible light 1 emitted by the laser light source 11 is generally in a range of 380 nm or more and 780 nm or less.

The optical modulator 12 receives the visible light 1 emitted from the laser light source 11 and changes an intensity of the visible light 1 to generate a visible light signal 2. The optical modulator 12 has, for example, an optical waveguide of visible light, and may be configured to change the intensity of the visible light 1 by adding an electrical signal sent from an electrical signal generation element 13 to the visible light 1 propagating in the optical waveguide, and modulate the visible light 1 to a bright light 1a or a dark light 1b to generate the visible light signal 2. As the optical modulator 12, for example, a Mach-Zehnder type optical modulator can be used. The Mach-Zehnder optical modulator takes less time to modulate the visible light 1 to the bright light 1a or the dark light 1b than the on/off switching time of the visible light source. Therefore, the transmission device 10 has an increased generation speed of the visible light signal 2.

The electrical signal generation element 13 receives information data to be transmitted, and outputs this to the optical modulator 12 as an electrical signal.

Figure 3:
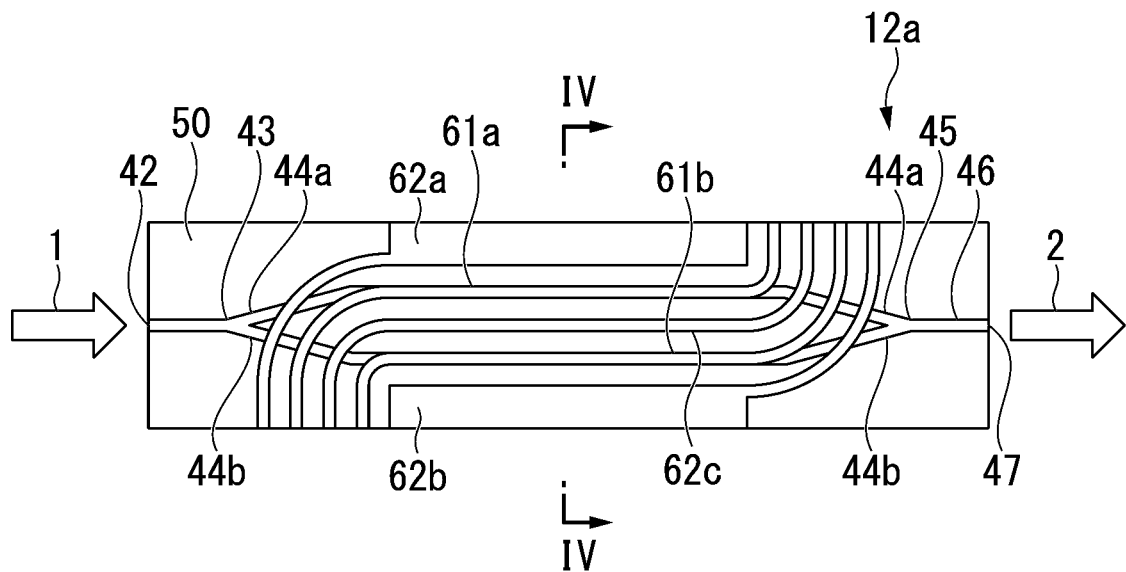
FIG. 3 is a plan view which shows an example of an optical modulator that can be used in the transmission device of the first embodiment.
Figure 4:
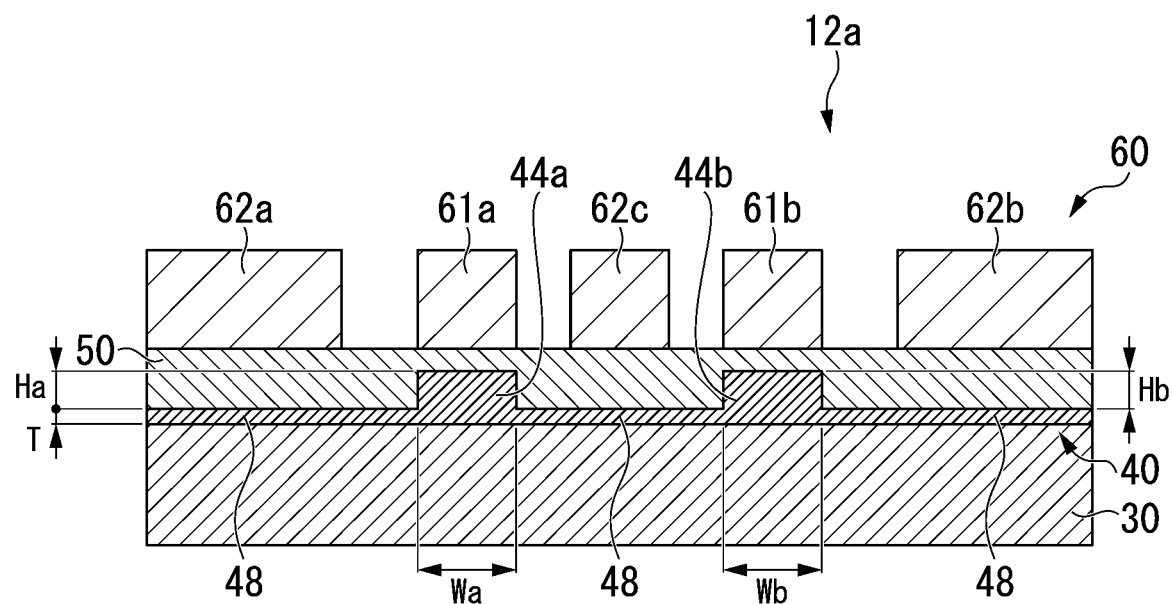
FIG. 4 is a sectional view taken along line IV-IV of FIG. 3.

FIG. 3 is a plan view which shows an example of the optical modulator that can be used in the transmission device 10 according to the present embodiment, and FIG. 4 is a sectional view taken along line IV-IV of FIG. 3.

An optical modulator 12a shown in FIGS. 3 and 4 has a substrate 30, an optical waveguide layer 40, a buffer layer 50, and an electrode layer 60. The optical modulator 12a is a Mach-Zehnder type optical modulator. The optical waveguide layer 40 is constituted by a lithium niobate film.

The substrate 30 is not particularly limited as long as it has a lower refractive index than the lithium niobate film constituting the optical waveguide layer 40, but it is preferably a substrate capable of forming the lithium niobate film as an epitaxial film. The substrate 30 may be, for example, a single crystal substrate such as a sapphire single crystal substrate, a silicon single crystal substrate or an aluminum oxide ($Al_2O_3$) single crystal substrate. A crystal orientation of the single crystal substrate is not particularly limited. The lithium niobate film constituting the optical waveguide layer 40 has a property of being easily formed as a c-axis oriented epitaxial film on a single crystal substrate having various crystal orientations. The c-axis oriented lithium niobate film has three-fold symmetry. For this reason, it is desirable that the single crystal substrate used as a base substrate 30 also have the same symmetry. The substrate 30 may be, for example, a c-plane substrate in the case of the sapphire single crystal substrate or aluminum oxide single crystal substrate, and a (111)-plane substrate in the case of the silicon single crystal substrate.

The lithium niobate film constituting the optical waveguide layer 40 is formed of a visible light permeable material containing lithium niobate. The visible light permeable material need only be permeable to visible light generated by the laser light source 11, and does not have to be permeable to all visible light. The lithium niobate film may be formed solely from lithium niobate.

Lithium niobate forming the lithium niobate film may contain elements other than lithium (Li), niobium (Nb), and oxygen (O). Lithium niobate may be a compound represented by the following formula (I).

$$Li_xNbA_yO_z \tag{I}$$

In formula (I), A represents an element other than Li, Nb, and O. Elements represented by A can include K, Na, Rb, Cs, Be, Mg, Ca, Sr, Ba, Ti, Zr, Hf, V, Cr, Mo, W, Fe, Co, Ni, Zn, Sc, Ce, and the like. One of these elements may be used alone, or two or more of these elements may be used in combination. x represents a number of 0.5 or more and 1.2 or less. x is preferably a number of 0.9 or more and 1.05 or less. y represents a number of 0 or more and 0.5 or less. z represents a number of 1.5 or more and 4.0 or less. z preferably represents a number of 2.5 or more and 3.5 or less.

The optical waveguide layer 40 has an optical waveguide 41 composed of a ridge portion and a flat portion 48. The optical waveguide 41 serves as a transmission path of the visible light 1 in which the visible light 1 emitted by the laser light source 11 propagates. A transmission direction of the visible light 1 in the optical waveguide 41 is a direction in which the visible light 1 propagates. The optical waveguide 41 includes a light receiving portion 42, a branch portion 43, a first branch optical waveguide 44a, a second branch optical waveguide 44b, a coupling portion 45, a visible light signal generation unit 46, and a visible light signal emitting unit 47. The light receiving portion 42 is disposed at a position where one end thereof can receive the visible light 1 generated by the laser light source 11. The branch portion 43 connects to the other end of the light receiving portion 42 and to one ends of the first branch optical waveguide 44a and the second branch optical waveguide 44b. The other ends of the first branch optical waveguide 44a and the second branch optical waveguide 44b connect to one end of the coupling portion 45. The other end of the coupling portion 45 connects to one end of the visible light signal generation unit 46. The other end of the visible light signal generation unit 46 is the visible light signal emitting unit 47. The visible light signal 2 is emitted from the visible light signal emitting unit 47.

A thickness (T in FIG. 4) of the flat portion 48 of the optical waveguide layer 40 is preferably in a range of 1 nm or more and 200 nm or less. The optical waveguide layer 40 may not have the flat portion 48 and may be constituted by only the optical waveguide 41.

A width (Wa in FIG. 4) of a cross section of the first branch optical waveguide 44a (a cross section in a direction perpendicular to the transmission direction of the visible light 1) is preferably in a range of 510.4 nm or more and 1182.5 nm or less. Moreover, a height of the cross section of the first branch optical waveguide 44a (Ha in FIG. 4) is preferably in a range of 510.4 nm or more and 709.5 nm or less. On the other hand, a width of a cross section of the second branch optical waveguide 44b (Wb in FIG. 4) is preferably in a range of 510.4 nm or more and 1182.5 nm or less. Furthermore, a height of the cross section of the second branch optical waveguide 44b (Hb in FIG. 4) is preferably in a range of 510.4 nm or more and 709.5 nm or less. In FIG. 4, the cross sectional shapes of the first branch optical waveguide 44a and the second branch optical waveguide 44b are rectangular, but the cross sectional shape is not limited thereto. The cross sectional shapes of the first branch optical waveguide 44a and the second branch optical waveguide 44b may be, for example, trapezoidal or semicircular.

It is preferable that the first branch optical waveguide 44a and the second branch optical waveguide 44b satisfy at least one of the following equations (1) and (2), respectively. It is more preferable that the first branch optical waveguide 44a and the second branch optical waveguide 44b satisfy the following two equations (1) and (2), respectively.

$$(0.8 \times A) \leq W \leq (2.5 \times A) \quad (1):$$

$$(0.8 \times A) \leq H \leq (1.5 \times A) \quad (2):$$

However, in the equations (1) and (2) described above, W (unit: nm) is a length of the width Wa of the cross section of the first branch optical waveguide 44a and the width Wb of the cross section of the second branch optical waveguide 44b. H (unit: nm) is a length of the height Ha of the cross section of the first branch optical waveguide 44a and the height Hb of the cross section of the second branch optical waveguide 44b. A (unit: nm) is a wavelength of the visible light generated by the laser light source 11. In the case of the cross sectional shapes of the first branch optical waveguide 44a and the second branch optical waveguide 44b are trapezoidal or semicircular, the waveguides do not have to satisfy the condition of the equation (1) as a whole, if they have a part that satisfy the condition of the equation (1).

The widths of cross sections of the light receiving portion 42 and the visible light signal generation unit 46 are preferably in the range of 510.4 nm or more and 1182.5 nm or less. In addition, it is preferable that the light receiving portion 42 and the visible light signal generation unit 46 satisfy at least one of the equations (1) and (2) described above when the widths of the cross sections are set to W (unit: nm), the heights of the cross sections are set to H (unit: nm), and a wavelength of visible light generated by a laser element is set to A (unit: nm). It is more preferable that the light receiving portion 42 and the visible light signal generation unit 46 satisfy the two equations (1) and (2) described above, respectively.

The lithium niobate film constituting the optical waveguide layer 40 may be an epitaxial film.

Here, the epitaxial film is a single crystal film in which the crystal orientations are aligned by being grown on the substrate 30. That is, the epitaxial film is a film having a single crystal orientation in a film thickness direction and a film in-plane direction, and, when the film in-plane is set to an XY plane and the film thickness direction is set to a Z axis, the crystals are aligned and oriented in X-axis, Y-axis, and Z-axis directions. It can be proved whether a film is the epitaxial film, for example, by confirming the peak intensity and the extreme point at the orientation position in 2θ-θX-ray diffraction.

As a method for forming the lithium niobate film, for example, a thin film forming method such as a sputtering method, a CVD method, or a sol-gel method can be used. In the lithium niobate film, a c-axis is oriented perpendicular to a main surface of the substrate 30, and an electric field is applied parallel to the c-axis, and thereby an optical refractive index changes in proportion to the electric field. When a sapphire single crystal substrate is used as the substrate 30, a lithium niobate film may be epitaxially grown directly on the sapphire single crystal substrate. When a silicon single crystal substrate is used as the substrate 30, a lithium niobate film may be formed by epitaxial growth via a clad layer. As the clad layer, a layer having a lower refractive index than the lithium niobate film and suitable for epitaxial growth is used. For example, if $Y_2O_3$ is used as the clad layer, a high-quality lithium niobate film can be formed. The optical waveguide 41 formed of a ridge portion can be formed in a method of forming a pattern of the lithium niobate film into a desired shape by using a method such as a photolithography method.

By using the lithium niobate film as an epitaxial film, a visible light permeability of the lithium niobate film is improved.

Figure 5:
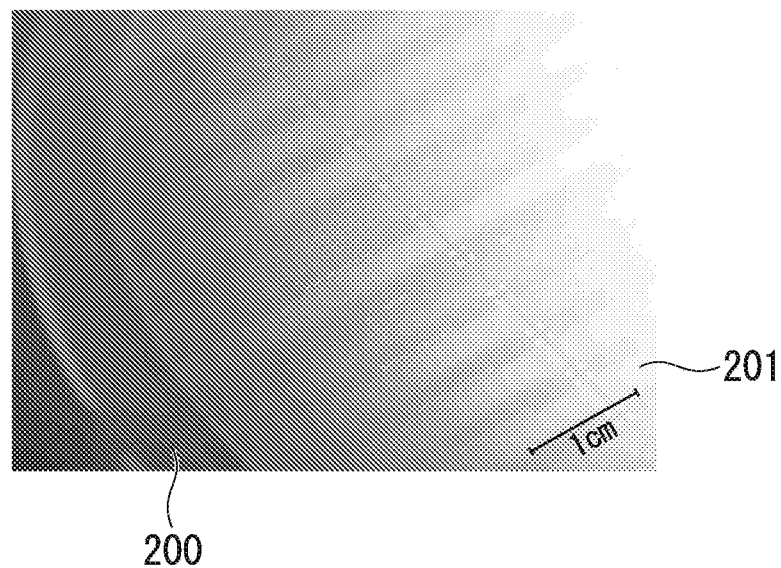
FIG. 5 is a photograph of a lithium niobate film grown on a sapphire single crystal substrate.

FIG. 5 is a photograph of a lithium niobate film grown on the sapphire single crystal substrate. In the sapphire single crystal substrate 200, a plurality of metal wires 201 are formed at intervals. The lithium niobate film is formed by an RF sputtering method using a lithium niobate target. The thickness of the lithium niobate film is 1.5 μm. As shown in FIG. 5, since the metal wire 201 can be visually confirmed from a surface of the lithium niobate film, it can be known that the lithium niobate film has extremely high visible light permeability.

The buffer layer 50 is formed between the optical waveguide layer 40 and the electrode layer 60 to prevent visible light propagating in the optical waveguide 41 from being absorbed by the electrode layer 60. The buffer layer 50 preferably has a lower refractive index than the optical waveguide layer 40. The buffer layer 50 is preferably a dielectric. As a material of the buffer layer 50, silicon oxide ($SiO_2$), aluminum oxide ($Al_2O_3$), lanthanum oxide ($La_2O_3$), a composite of these oxides, or the like can be used. As the composite, for example, SiAlLaOx may be used. A thickness of the buffer layer 50 is, for example, in a range of 0.2 μm or more and 1 μm or less at the thinnest portion.

As a method for forming the buffer layer, for example, the thin film forming method such as a sputtering method, a CVD method, or a sol-gel method can be used.

The electrode layer 60 has a first signal electrode 61a, a second signal electrode 61b, a first ground electrode 62a, a second ground electrode 62b, and a third ground electrode 62c. The first signal electrode 61a faces the first branch optical waveguide 44a via the buffer layer 50 to modulate visible light traveling in the first branch optical waveguide 44a. The second signal electrode 61b faces the second branch optical waveguide 44b via the buffer layer 50 to modulate visible light traveling in the second branch optical waveguide 44b. The first ground electrode 62a is disposed along the first signal electrode 61a on a side opposite to the second signal electrode 61b side of the first signal electrode 61a. The second ground electrode 62b is disposed along the second signal electrode 61b on a side opposite to the first signal electrode 61a side of the second signal electrode 61b. The third ground electrode 62c is disposed between the first signal electrode 61a and the second signal electrode 61b along the first ground electrode 62a and the second signal electrode 61b. The first ground electrode 62a, the second ground electrode 62b, and the third ground electrode 62c are connected by a bonding wire (not shown). In this manner, the first ground electrode 62a, the second ground electrode 62b, and the third ground electrode 62c are electrically connected to each other, and thereby in-plane potentials of the ground electrodes can be made uniform, and a high frequency characteristic of the optical modulator 12 can be improved.

As a material of the electrode layer 60, for example, a metal such as gold, silver, copper, platinum ruthenium, cobalt, tungsten, molybdenum, or the compound of these metals can be used.

As a method for forming the electrode layer 60, for example, a metal thin film is formed by using a thin film forming method such as a vapor deposition method, a sputtering method, a CVD method, or a sol-gel method, and then a method of forming a pattern in a desired shape using a method such as a photolithography method can be used. In addition, when the metal thin film is formed by vapor deposition, sputtering method, or the like, a pattern may be formed by using a mask having a desired shape.

The electrical signal generation element 13 receives information data to be transmitted, and outputs it as an electrical signal to the electrode layer 60 (the first signal electrode 61a and the second signal electrode 61b) of the optical modulator 12a.

In the optical modulator 12a, the visible light signal 2 is generated as follows.

First, the visible light 1 is received by the light receiving portion 42. The visible light 1 received by the light receiving portion 42 propagates from the light receiving portion 42 to the branch portion 43, is branched at the branch portion 43, and propagates to the first branch optical waveguide 44a and the second branch optical waveguide 44b.

On the other hand, the electrical signal generation element 13 outputs the information data to be transmitted as an electrical signal to the first signal electrode 61a and the second signal electrode 61b. An electrical signal is applied to the first signal electrode 61a and the second signal electrode 61b, and thereby a phase difference occurs between visible light propagating in the first branch optical waveguide 44a and visible light propagating in the second branch optical waveguide 44b.

The visible light 1 propagating in the first branch optical waveguide 44a and the visible light 1 propagating in the second branch optical waveguide 44b are coupled at a coupling portion 45. When the phase difference between the visible light propagating in the first branch optical waveguide 44a and the visible light 1 propagating in the second branch optical waveguide 44b is 0 or 360°, the visible lights 1 of both are combined at the coupling portion 45, and they propagate to the visible light signal generation unit 46 as they are. On the other hand, when the phase difference between the visible light 1 propagating in the first branch optical waveguide 44a and the visible light 1 propagating in the second branch optical waveguide 44b is 180°, since the visible lights of both interfere with each other to cancel each other out at the coupling portion 45, the visible lights 1 do not propagate to the visible light signal generation unit 46. In the visible light signal generation unit 46, a visible light signal 2 having a predetermined waveform is generated by a combination of when the visible lights 1 propagate and when the visible lights 1 do not propagate. The generated visible light signal 2 is transmitted to the outside via the visible light signal emitting unit 47.

In the transmission device of the present embodiment, the optical modulator 12 is not limited to the configurations shown in FIGS. 3 and 4. For example, the optical modulators having the configurations shown in FIGS. 6 and 7 can be used.

Figure 6:
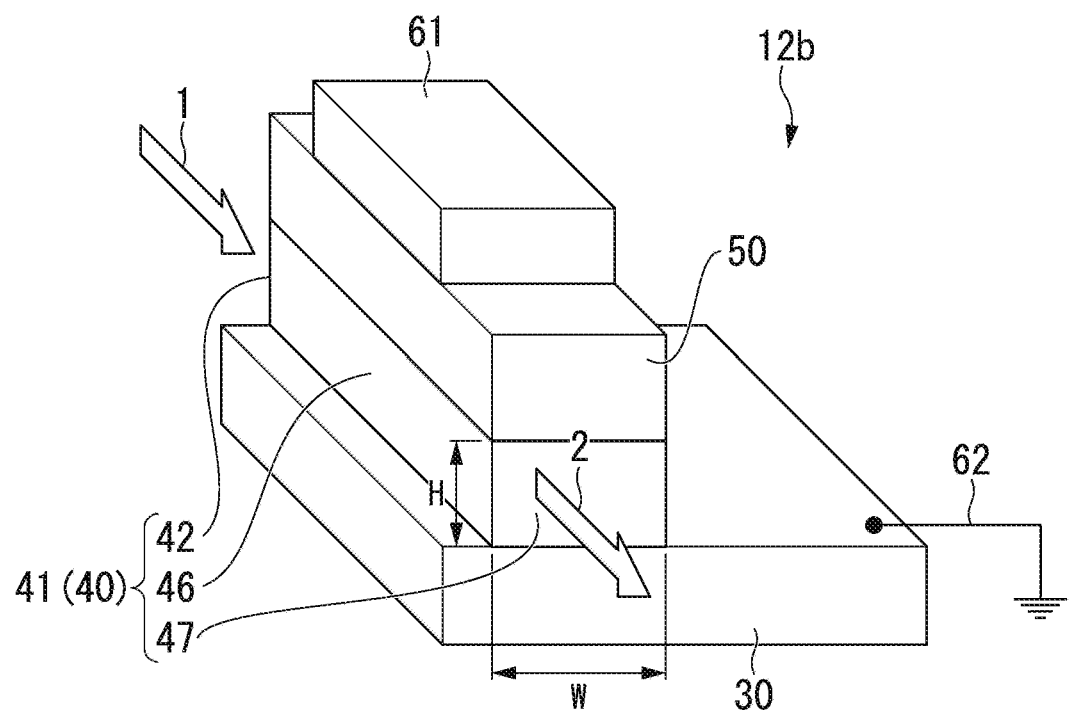
FIG. 6 is a perspective view which shows another example of the optical modulator that can be used in the transmission device of the first embodiment.

The optical modulator 12b shown in FIG. 6 includes the substrate 30, the optical waveguide layer 40, the buffer layer 50, the signal electrode 61, and the ground electrode 62. The optical waveguide layer 40 does not have a flat portion, and has only the optical waveguide 41. The optical waveguide layer 40 does not have a branch, and has the light receiving portion 42, the visible light signal generation unit 46, and the visible light signal emitting unit 47 which are linearly connected to each other. The optical modulator 12b is different from the optical modulator 12a shown in FIGS. 3 and 4 in that the optical waveguide layer 40 has only the optical waveguide 41, and the optical waveguide 41 has the light receiving portion 42, the visible light signal generation unit 46, and the visible light signal emitting unit 47 which are linearly connected to each other.

The optical waveguide 41 preferably has a width W of a cross section perpendicular to the transmission direction of visible light in the range of 510.4 nm or more and 1182.5 nm or less, and a height H of the cross section in the range of 510.4 nm or more and 709.5 nm or less. Moreover, when the width of the cross section is set to Wnm, the height of the cross section is set to Hnm, and a wavelength of the visible light emitted from the laser light source is set to Anm, it is preferable that at least one of the equations (1) and (2) be satisfied.

The signal electrode 61 is disposed above the visible light signal generation unit 46 via the buffer layer 50. The ground electrode 62 may be connected to the substrate 30 or may be connected to the optical waveguide 41.

In the optical modulator 12b, the visible light signal 2 is generated as follows.

First, the visible light 1 is received by the light receiving portion 42. The visible light 1 received by the light receiving portion 42 propagates from the light receiving portion 42 to the visible light signal generation unit 46. When an electrical signal is applied to the signal electrode 61, a phase difference occurs in the visible light 1 propagating in the visible light signal generation unit 46, and the intensity of the visible light 1 changes. As a result, a visible light signal 2 having a predetermined waveform is generated. The generated visible light signal 2 is transmitted to the outside via the visible light signal emitting unit 47.

Figure 7:
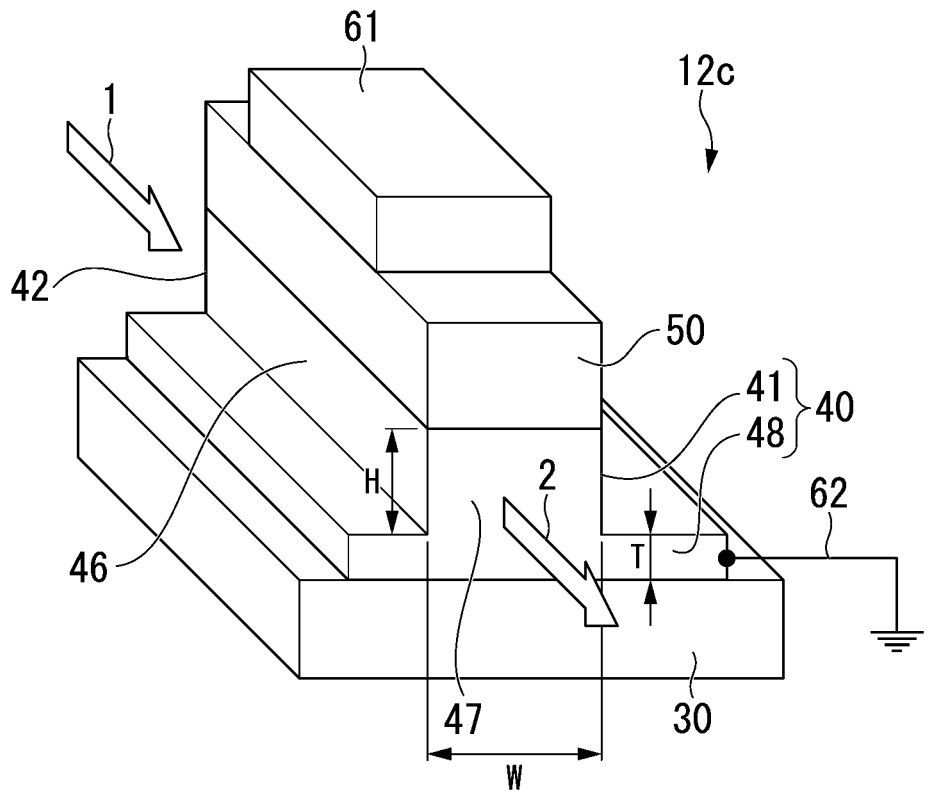
FIG. 7 is a perspective view which shows still another example of the optical modulator that can be used in the transmission device of the first embodiment.

An optical modulator 12c shown in FIG. 7 includes the substrate 30, the optical waveguide layer 40, the buffer layer 50, the signal electrode 61, and the ground electrode 62. The optical waveguide layer 40 has the optical waveguide 41 formed of a rigid portion and the flat portion 48. The optical modulator 12c differs from the optical modulator 12b shown in FIG. 6 in that the optical waveguide layer 40 has the flat portion 48.

The flat portion 48 of the optical waveguide layer 40 preferably has a thickness T in the range of 1 nm or more and 200 nm or less. The optical waveguide 41 has, similarly to in the optical modulator 12b shown in FIG. 6, the light receiving portion 42, the visible light signal generation unit 46, and the visible light signal emitting unit 47, which are linearly connected to each other. The width W and height H of a cross section perpendicular to the transmission direction of visible light in the optical waveguide 41 are the same as in the case of the optical modulator 12b shown in FIG. 6.

The signal electrode 61 is disposed above the visible light signal generation unit 46 via the buffer layer 50. The ground electrode 62 may be connected to the substrate 30, may be connected to the optical waveguide 41, or may also be connected to the flat portion 48.

In the optical modulator 12c, a visible light signal 2 is generated in the same manner as in the optical modulator 12b shown in FIG. 6.

Moreover, the optical modulator 12 may be a Michelson interferometer-type modulator.

Figure 8:
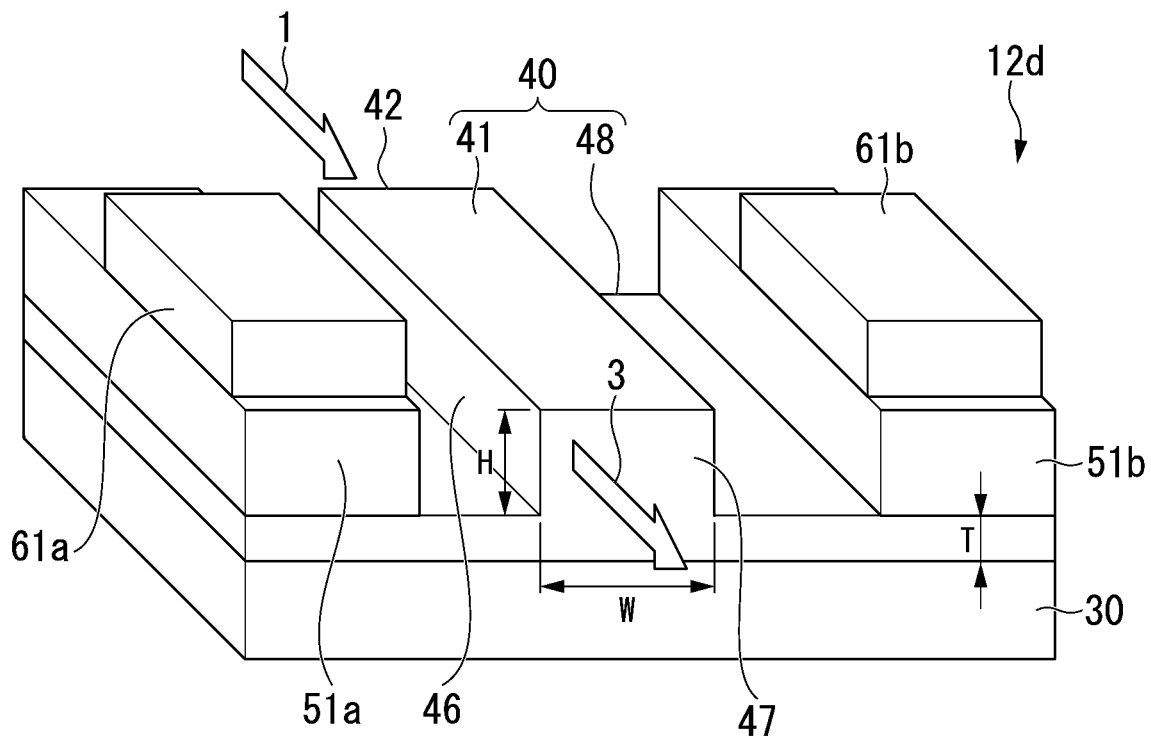
FIG. 8 is a perspective view of an example of a phase modulation portion of a Michelson interferometer-type modulator that can be used in the transmission device of the first embodiment.

FIG. 8 is a perspective view of an example of a phase modulation portion of the Michelson interferometer-type modulator. The phase modulation portion 12d includes the substrate 30, the optical waveguide layer 40 having the optical waveguide 41 composed of the rigid portion and the flat portion 48, a first insulation layer 51a and a second insulation layer 51b provided on the flat portion 48 to face a position at which the optical waveguide 41 is sandwiched, a first signal electrode 61a provided on the first insulation layer 51a, and a second signal electrode 61b provided on the second insulation layer 51b. The optical waveguide layer 40 is constituted by a lithium niobate film.

The configuration and material of the substrate 30 are the same as those in the optical modulator 12a shown in FIGS. 3 and 4.

The material and forming method of the lithium niobate film constituting the optical waveguide layer 40 are the same as those in the optical modulator 12a shown in FIGS. 3 and 4. The optical waveguide 41 has the light receiving portion 42, the visible light signal generation unit 46, and the visible light signal emitting unit 47. The width W and height H of the cross section of the optical waveguide 41 perpendicular to the transmission direction of visible light are the same as those in the optical modulator 12b shown in FIG. 6. The flat portion 48 preferably has a thickness T in the range of 1 nm or more and 200 nm or less.

As materials of the first insulation layer 51a and the second insulation layer 51b, an oxide (La—Al—Si—O) containing lanthanum (La), aluminum (Al), and silicon (Si), and the like can be used. The widths and heights of the first insulation layer 51a and the second insulation layer 51b may be the same as those of the optical waveguide 41. A distance between the first insulation layer 51a and the optical waveguide 41 and a distance between the second insulation layer 51b and the optical waveguide 41 may be in a range of 2 μm or more and 5 μm or less.

The first signal electrode 61a and the second signal electrode 61b are provided on the first insulation layer Ma and the second insulation layer 51b facing the visible light signal generation unit 46, respectively. The materials and forming methods of the first signal electrode 61a and the second signal electrode 61b are the same as those in the optical modulator 12a shown in FIGS. 3 and 4.

In the phase modulation portion 12d, a phase-modulated modulated light 3 is generated as follows.

First, the visible light 1 is received by the light receiving portion 42. The visible light 1 received by the light receiving portion 42 propagates from the light receiving portion 42 to the visible light signal generation unit 46. When an electrical signal is applied to the first signal electrode 61a and the second signal electrode 61b, a phase difference occurs in the visible light 1 propagating in the visible light signal generation unit 46, and the phase-modulated modulated light 3 is generated.

Figure 9:
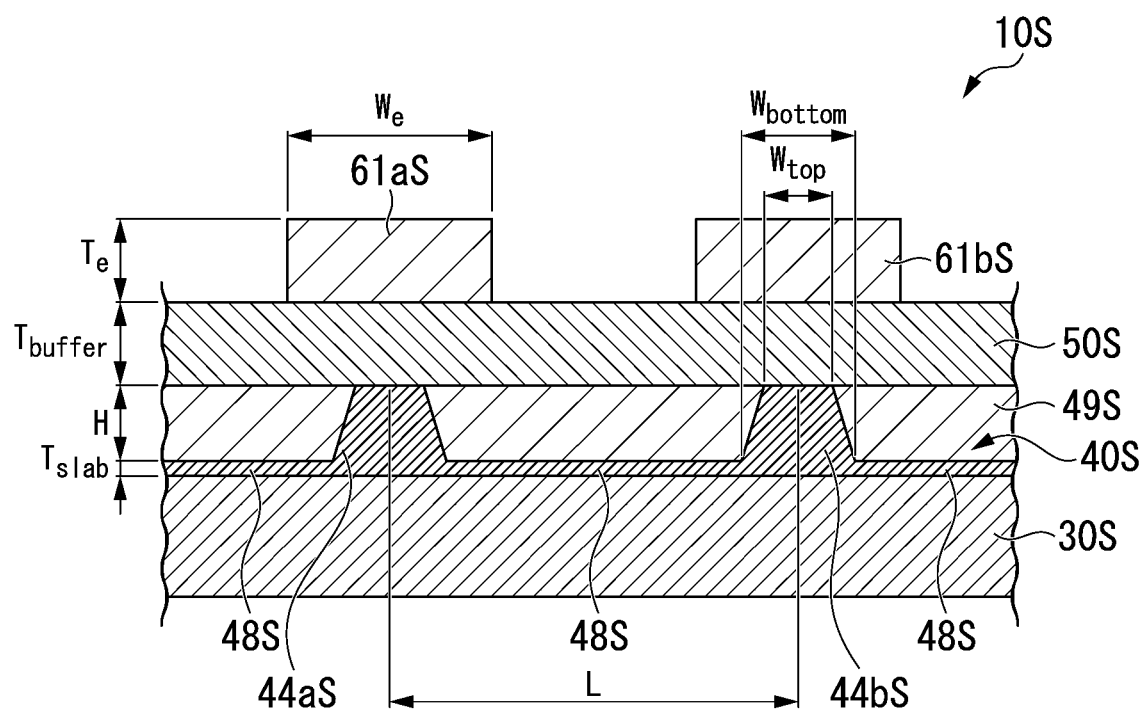
FIG. 9 is a sectional view of an optical modulator used to calculate a voltage value required to modulate light in an optical modulator whose optical waveguide is made of lithium niobate by simulation.

The voltage value required to modulate the light using an optical modulator whose optical waveguide is made of lithium niobate was calculated by simulation. As the optical modulator, the optical modulator having the configuration shown in FIG. 9 is presupposed. As shown in FIG. 9, the light modulator 12S includes a substrate 30S, an optical waveguide layer 40S, a protective layer 49S, a buffer layer 50S, a first signal electrode 61aS, and a second signal electrode 61bS. The optical waveguide layer 40S has a first-branch optical waveguide 44aS, a second branch optical waveguide 44bS, and a flat portion 48S. The first signal electrode 61aS is arranged above the first branch optical waveguide 44aS via the buffer layer 50S. The second signal electrode 61bS is arranged above the second branch optical waveguide 44bS via the buffer layer 50S. The protective layer 49S is interposed between the flat portion 48S and the buffer layer 50S in the region where the first-branch optical waveguide 44aS and the second-branch optical waveguide 44b are not arranged. The protective layer 49S and the buffer layer 50S are dielectrics having a lower refractive index than the optical waveguide layer 40S. The protective layer 49S and the buffer layer 50S may be made of the same material or may be made of different materials, respectively. The cross sections of the first branch optical waveguide 44aS and the second branch optical waveguide 44bS are trapezoidal in which the width of the bottom ($W_{bottom}$) is wider than the width of the top ($W_{top}$), respectively. The height (H), the width of the top ($W_{top}$), and the width of the bottom ($W_{bottom}$) in the cross section of the first-branch optical waveguide 44aS and the second-branch optical waveguide 44bS, the thickness ($T_{slab}$) of the Flat portion 48S, the thickness ($T_{buffer}$) of the buffer layer SOS, the distance (L) between the center of the first branch optical waveguide 44aS and the center of the second branch optical waveguide 44bS, the width (We) and thickness (Te) of the first signal electrode 61aS and the second signal electrode 61bS are shown in Table 1 below.

TABLE 1

| | |
|---|---|
| H | 0.56 μm |
| $W_{top}$ | 0.8 μm |
| $W_{bottom}$ | 1.1 μm |
| $T_{slab}$ | 0.15 μm |
| $T_{buffer}$ | 0.5 μm |
| L | 11 μm |
| $W_e$ | 2.5 μm |
| $T_e$ | 2 μm |

Using the light modulator 12S, the voltage value Vπ required to phase-modulate the wavelength of light to half-wavelength (half-wavelength phase modulation voltage value), that is, the voltage value Vπ required to change the intensity of light from the maximum value to the minimum value was calculated by simulation. The light used for the calculation was light having a wavelength of 638 nm (red light), light with a wavelength of 520 nm (green light), and light with a wavelength of 473 nm (blue light). The voltage value Vπ is inversely proportional to the interaction length Li, which is the length of the portion where the signal electrode overlaps the optical waveguide. Therefore, it is generally compared as an integrated value Vπ*Li [V*cm], which is the product of the voltage value Vπ and the interaction length Li. When the integrated value Vπ*Li [V*cm] is calculated with respect to the interaction length of the signal electrodes (first signal electrode 61aS and second signal electrode 61bS), the red light is 1.79 V*cm, the green light is 1.39 V*cm and the blue light is 1.20 V*cm. That is, when the length of the signal electrodes (interaction length) is 1 cm, the voltage value Vπ is 1.79 V for red light, 1.39 V for green light, and 1.20 V for blue light. Here, for red light, the voltage value Vπ is 1.79V when the interaction length is 1 cm, but when the interaction length is 2 cm, the voltage value Vπ becomes 0.895V and the interaction length is 0.5 cm, the voltage value Vπ becomes 3.58 V. Similarly, for green light and blue light, the voltage value Vπ changes according to the interaction length.

The relationship between the wavelength ($A_{red}$) of red light and the size of the optical waveguide (first branch optical waveguide 44aS and second branch optical waveguide 44bS) is $W_{top}/A_{red}=1.25$, $W_{bottom}/A_{red}=1.72$, $H/A_{red}=1.11$ and satisfied the relationship of the above equations (1) and (2). The relationship between the wavelength ($A_{green}$) of green light and the size of the optical waveguide is $W_{top}/A_{green}=1.53$, $W_{bottom}/A_{green}=2.11$ and $H/A_{green}=1.36$, and satisfied the relationship of the above equations (1) and (2). The relationship between the wavelength ($A_{Blue}$) of blue light and the size of the optical waveguide is $W_{top}/A_{blue}=1.69$, $W_{bottom}\ A_{blue}=2.32$, $H/A_{blue}=1.50$, and satisfied the relationship of the above equations (1) and (2).

From the above results, it was confirmed that the voltage value VIE required for phase-modulating the light is lower when the wavelength of the light to be modulated is shorter. When this voltage value is low, the length of the signal electrode can be shortened, and the light modulator can be made smaller and less costly. In addition, from the results of the above simulation, it was confirmed that one light modulator can modulate three different visible light lights. This is very advantageous in terms of diversification of usage, for example, it becomes possible to use visible light signals having different colors depending on the destination.

According to the transmission device 10 of the present embodiment having the configuration described above, since the laser light source 11 is used as a visible light source, directivity of the emitted visible light 1 is high. For this reason, the optical modulator 12 can be used as a modulation method of the visible light 1, thereby a generation speed of the visible light signal 2 can be increased. Moreover, since the optical waveguide 41 of the optical modulator 12 is formed by a lithium niobate film containing lithium niobate, there is a small loss of visible light in the optical waveguide 41. Therefore, according to the transmission device 10 of the present embodiment, the generation speed of the visible light signal 2 is high, and the intensity of the obtained visible light signal 2 is increased. For this reason, visible light communication at a high speed and with high accuracy becomes possible by using the transmission device 10 of the present embodiment. In particular, according to the transmission device 10 of the present embodiment, a data transfer speed can be set to, for example, 10 Gbit/s or more, and particularly from several hundred Gbit/s to 1 Tbib/s. Moreover, since it is not necessary to dispose visible light sources in an array in the transmission device 10 of the present embodiment, the size can be decreased easily.

Moreover, in the transmission device 10 of the present embodiment, when the optical modulator 12 has a substrate 30 and the optical waveguide 41 is a lithium niobate film grown on the substrate 30, permeability of visible light in the optical waveguide 41 is improved. As a result, since a propagation efficiency of the visible light in the optical waveguide 41 is improved, the visible light 1 can be efficiently modulated, and the generation speed of the visible light signal 2 is increased.

Moreover, when the width of the cross section perpendicular to the transmission direction of the visible light 1 in the optical waveguide 41 of the optical modulator 12 is in the range of 510.4 nm or more and 1182.5 nm or less, and the height of the cross section is in the range of 510.4 nm or more and 709.5 nm or less in the transmission device 10 of the present embodiment, since the propagation characteristic of the visible light 1 in the optical waveguide 41 is stabilized, a quality of the generated visible light signal 2 is stabilized. If the size of the cross section of the optical waveguide 41 is larger than the range described above, a plurality of visible light propagation modes may be generated in the optical waveguide 41, and the quality of the visible light signal 2 may be unstable.

Moreover, in the transmission device 10 of the present embodiment, the width of the cross section perpendicular to the transmission direction of the visible light 1 in the optical waveguide 41 of the optical modulator 12 is set to Wnm, the height of the cross section is set to Hnm, and the wavelength of the visible light 1 emitted from the laser light source 11 is set to Anm, and at least one of the equations (1) and (2) is satisfied, since the propagation characteristic of the visible light 1 in the optical waveguide 41 is further stabilized, the quality of the generated visible light signal 2 is more stabilized. If neither of the equations (1) and (2) is satisfied, the plurality of visible light propagation modes may be generated in the optical waveguide 41, and the quality of the visible light signal 2 may be unstable.

Furthermore, when the height of the cross section of the flat portion 48 of the optical waveguide layer 40 of the optical modulator 12 is 200 nm or less in the transmission device 10 of the present embodiment, the visible light 1 is difficult to propagate in the flat portion 48. For this reason, the propagation efficiency of visible light of the first branch optical waveguide 44a and the second branch optical waveguide 44b is improved. Therefore, the accuracy of transmission/reception of the visible light signal 2 is further increased. Moreover, the height of the cross section of the flat portion 48 of the optical waveguide layer 40 is preferably ⅓ or less of the height of the cross section of the first branch optical waveguide 44a and the second branch optical waveguide 44b. In this case, the propagation efficiency of visible light of the first branch optical waveguide 44a and the second branch optical waveguide 44b is further improved.

Moreover, a method of extracting the visible light signal 2 to the outside is not particularly limited in the transmission device 10 of the present embodiment. The transmission device 10 may have an exit port for emitting the visible light signal 2. Moreover, the transmission device 10 may have a connection unit for connecting to an optical fiber that transmits the visible light signal 2 to the outside.

Second Embodiment

Figure 10:
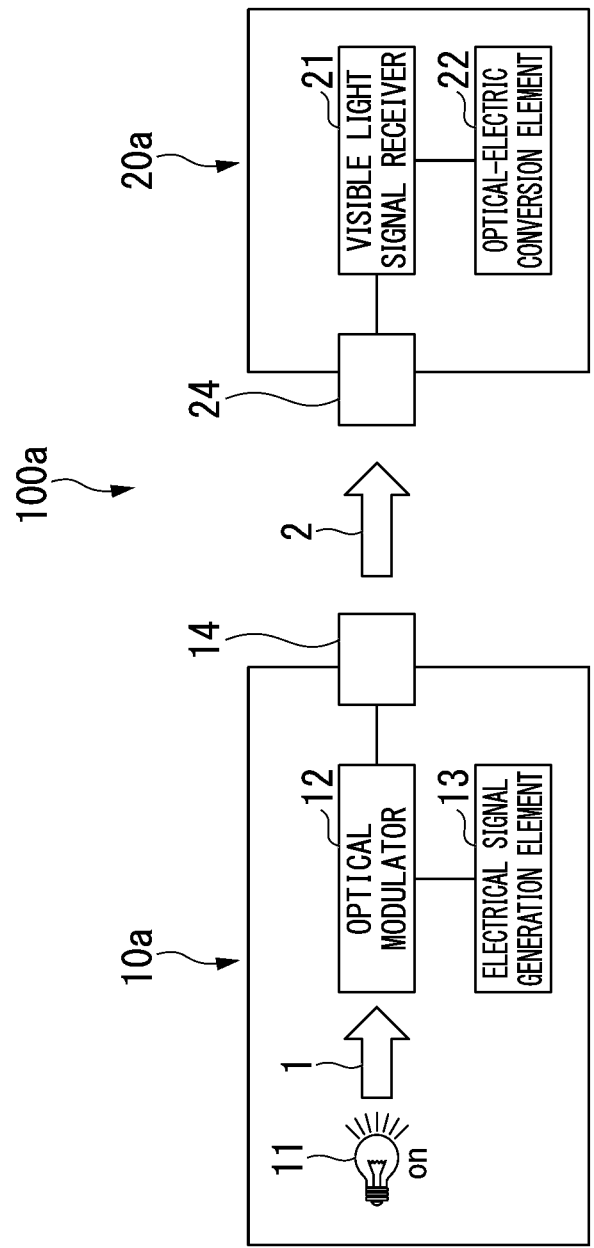
FIG. 10 is a block diagram of a communication system according to a second embodiment of the present disclosure.

FIG. 10 is a block diagram of a communication system according to a second embodiment of the present disclosure.

A communication system 100a shown in FIG. 10 transmits the visible light signal 2 generated by the transmission device 10a to a receiving device 20a via an external space.

The transmission device 10a includes the laser light source 11, the optical modulator 12, the electrical signal generation element 13, and a visible light signal exit port 14. The transmission device 10a is the same as the transmission device 10 shown in FIG. 2, except that it includes the visible light signal exit port 14. The visible light signal exit port 14 is an exit port for connecting to the optical modulator 12 and emitting the visible light signal 2 generated by the optical modulator 12 to the external space.

The receiving device 20a includes a visible light signal receiver 21, an optical-electric conversion element 22, and a visible light signal incident port 24. The visible light signal incident port 24 is an incident port for receiving the visible light signal 2 transmitted from the transmission device 10a. The visible light signal receiver 21 connects to the visible light signal incident port 24, receives the visible light signal 2 incident to the visible light signal incident port 24, and irradiates the optical-electric conversion element 22 with the incident visible light signal 2. The optical-electric conversion element 22 converts the visible light signal 2 into an electrical signal. The optical-electric conversion element 22 is not particularly limited as long as it is an element capable of detecting the visible light signal 2 at a high speed and converting it into an electrical signal, and any kind of element may be used.

The communication system 100a performs visible light communication as follows.

In the transmission device 10a, the visible light signal 2 is generated by the optical modulator 12 as described above. The generated visible light signal 2 is emitted to the external space via the visible light signal exit port 14. The emitted visible light signal 2 is received by the visible light signal receiver 21 via the visible light signal incident port 24 of the receiving device 20a. The received visible light signal 2 is converted into an electrical signal by the optical-electric conversion element 22, and information data added to the visible light signal 2 is extracted.

According to the communication system 100a according to the present embodiment having the configuration described above, since the intensity of the visible light signal 2 transmitted from the transmission device 10a is high, a communication path of the visible light signal 2 can be easy to be confirmed visually. Therefore, it is possible to prevent erroneous data transmission. In the case of a communication system using infrared light, it is not possible to visually confirm whether a visible light signal is received by the receiving device at a transmission destination. For this reason, there is a risk that a visible light signal will be sent to a person who is not intended to receive. According to the communication system 100a of the present embodiment, which can increase the data transfer speed per second to 10 Gbit/s or more, or from several hundred Gbit/s to 1 Tbib/s, the amount of data that can be transmitted per second is enormous, and a risk of sending data to a wrong person is increased while the communication system is very convenient. For this reason, a visible light communication, which can visually confirm whether a visible light signal is transmitted to a transmission destination and transmit data, has a great merit from a viewpoint of preventing erroneous transmission of data. Infrared light that cannot be seen is not always assured when data is transmitted.

Another merit of using visible light is that the size of the optical waveguide can be reduced because visible light has a shorter wavelength than infrared light. That is, the size of the optical modulator can be reduced. Since the size of the optical waveguide for visible light can be reduced by about ⅓ to ¼ per side as compared with the optical waveguide for infrared light, the area can be reduced to ⅑ to ¹⁄₁₆. That is, since the number of elements obtained per substrate for element creation is increased by about 10 times, a manufacturing cost of the optical modulator can be reduced to ⅑ to ¹⁄₁₆. For example, it is possible to realize consumer uses like information terminals such as smartphones. As long as infrared light is used, a chip size cannot be reduced. In other words, a cost of a modulation element is increased, and it is very difficult and impractical to use it for consumer uses.

As described above, the following two points can be mentioned as merits of using visible light for high-speed optical communication.

(1) Transmission is possible after a transmission destination is visually confirmed in the high-speed optical communication, and a large amount of data can be safely transmitted and received.

(2) An element size of an optical modulator can be reduced. This makes it possible to reduce a manufacturing cost of the optical modulator to ¹⁄₁₀ or less. As a result, it is possible to enjoy merits of ultra-high-speed communication even in consumer uses.

In the communication system of the present embodiment, an optical transmission means such as an optical fiber may be used for a visible light signal.

Figure 11:
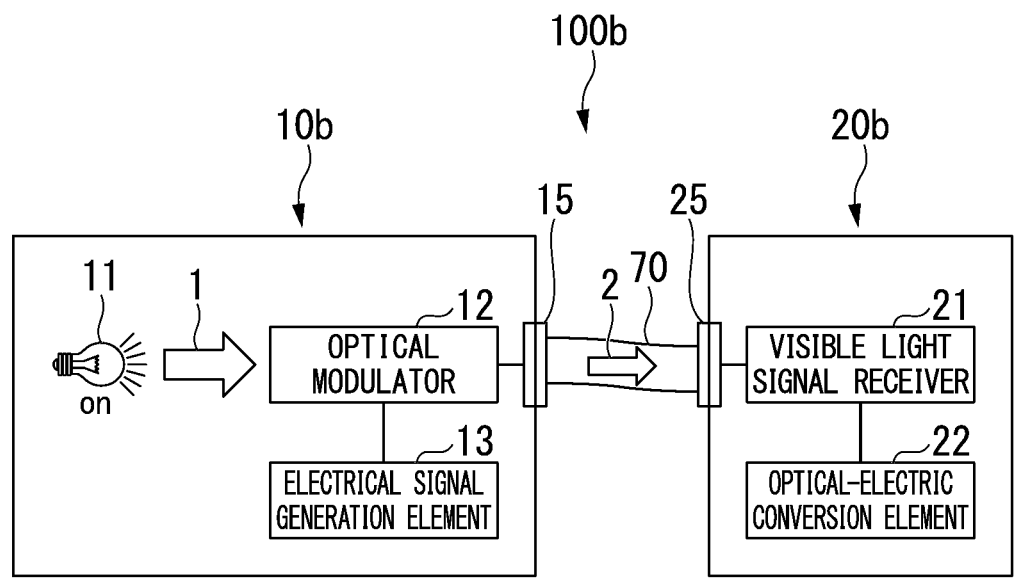
FIG. 11 is a block diagram which shows a modified example of the communication system according to the second embodiment of the present disclosure.

FIG. 11 is a block diagram which shows a modified example of the communication system according to the second embodiment of the present disclosure.

A communication system 100b shown in FIG. 11 is different from the communication system 100a shown in FIG. 10 in that the visible light signal 2 generated by a transmission device 10b is transmitted to the receiving device 20b via an optical fiber 70.

In the communication system 100b shown in FIG. 11, the transmission device 10b includes the laser light source 11, the optical modulator 12, the electrical signal generation element 13, and the output optical fiber connection unit 15. The output optical fiber connection unit 15 is a connection unit that connects to the optical modulator 12 and the optical fiber 70 and outputs the visible light signal 2 generated by the optical modulator 12 to the optical fiber 70.

The receiving device 20b includes the visible light signal receiver 21, the optical-electric conversion element 22, and the input optical fiber connection unit 25. The input optical fiber connection unit 25 is a connection unit that connects to the optical fiber 70 and the visible light signal receiver 21 and inputs the visible light signal 2 transmitted to the optical fiber 70 to the visible light signal receiver 21.

The communication system 100b performs visible light communication as follows.

In the transmission device 10b, the visible light signal 2 is generated by the optical modulator 12 as described above. The generated visible light signal 2 is output to the optical fiber 70 via the output optical fiber connection unit 15. The output visible light signal 2 propagates through the optical fiber 70 and is received by the visible light signal receiver 21 via the input optical fiber connection unit 25 of the receiving device 20b. The received visible light signal 2 is converted into an electrical signal by the optical-electric conversion element 22, and the information data added to the visible light signal 2 is extracted.

According to the communication system 100b according to the present embodiment having the configuration described above, since the visible light signal 2 generated by the transmission device 10b is transmitted to the receiving device 20b via the optical fiber 70, for example, the visible light signal 2 can be transmitted to a place where light does not pass, such as a room partitioned by a wall.

Third Embodiment

Figure 12:
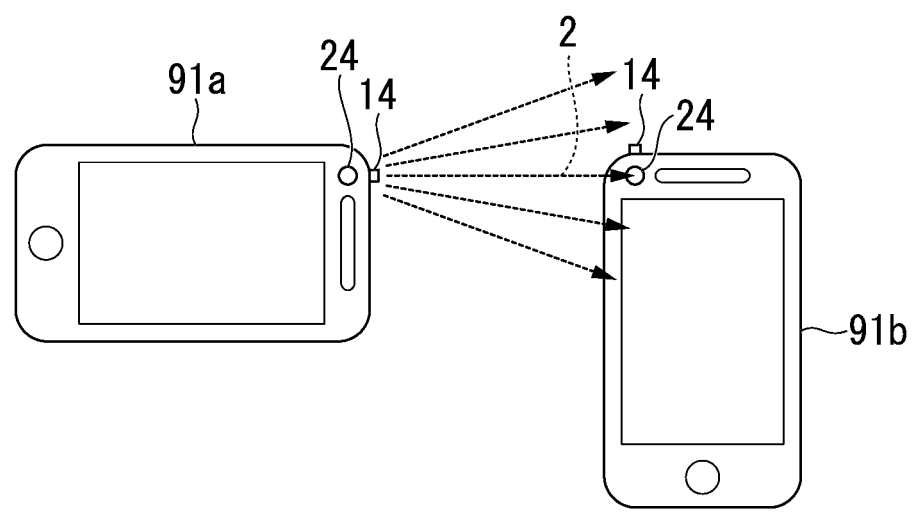
FIG. 12 is a diagram which shows an example of a use example of an information terminal according to a third embodiment of the present disclosure.

FIG. 12 is a diagram which shows an example of a use example of an information terminal according to a third embodiment of the present disclosure.

In FIG. 12, the transmission device 10a and the receiving device 20a shown in FIG. 10 are provided inside smartphones 91a and 91b, respectively. The smartphones 91a and 91b have a side surface and a flat surface having a display, the visible light signal exit port 14 of the transmission device 10a is exposed on one side surface, and the visible light signal incident port 24 of the receiving device 20a is provided on the flat surface having a display.

When data is transferred from the smartphone 91a to the smartphone 91b, the visible light signal 2 is transmitted with the visible light signal exit port 14 of the smartphone 91a directed to the visible light signal incident port 24 of the smartphone 91b. On the other hand, when data is transferred from the smartphone 91b to the smartphone 91a, the visible light signal 2 is transmitted with the visible light signal exit port 14 of the smartphone 91b directed to the visible light signal incident port 24 of the smartphone 91a.

Figure 13:
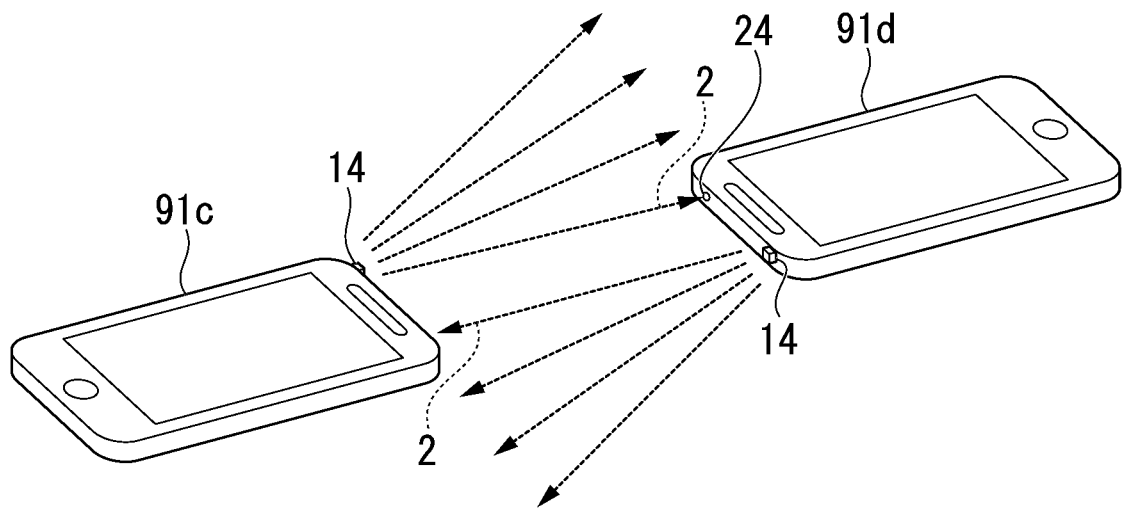
FIG. 13 is a diagram which shows another example of a use example of the information terminal according to the third embodiment of the present disclosure.

FIG. 13 is a diagram which shows another example of the use example of an information terminal according to the third embodiment of the present disclosure.

FIG. 13, the transmission device 10a and the receiving device 20a shown in FIG. 10 are provided inside the smartphones 91c and 91d, respectively. The smartphones 91c and 91d have a side surface and a flat surface having a display, and the visible light signal exit port 14 of the transmission device 10a and the visible light signal incident port 24 of the receiving device 20a are exposed on one side surface.

When data is transferred to the smartphone 91c and the smartphone 91d each other, the visible light signal 2 is transmitted with the visible light signal exit port 14 and the visible light signal incident port 24 of the smartphone 91c and the visible light signal exit port 14 and the visible light signal incident port 24 of the smartphone 91d facing each other.

Figure 14:
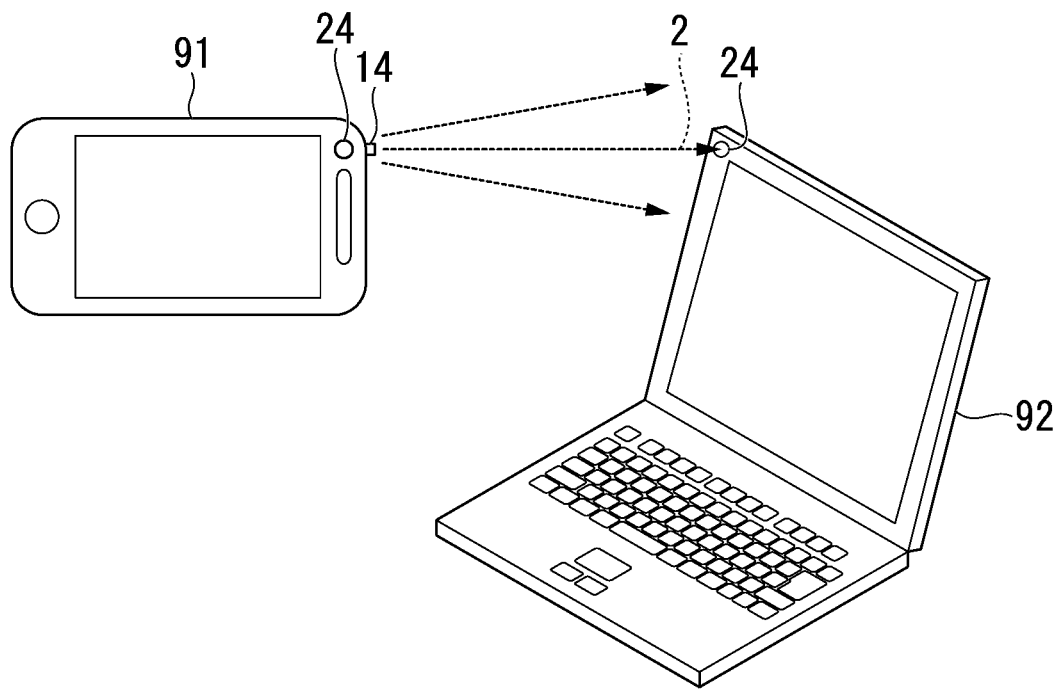
FIG. 14 is a diagram which shows still another example of a use example of the information terminal according to the third embodiment of the present disclosure.

FIG. 14 is a diagram which shows still another example of the use example of an information terminal according to the third embodiment of the present disclosure.

FIG. 14, the transmission device 10a and the receiving device 20a shown in FIG. 10 are provided inside the smartphone 91. The smartphone 91 has a side surface and a flat surface having a display, the visible light signal exit port 14 of the transmission device 10a is exposed on one side surface, and the visible light signal incident port 24 of the receiving device 20a is provided on the flat surface having a display. On the other hand, the receiving device 20a shown in FIG. 10 is provided inside the personal computer 92. The visible light signal incident port 24 is exposed near the display of the personal computer 92.

When data is transferred from the smartphone 91a to the personal computer 92, the visible light signal 2 is transmitted with the visible light signal exit port 14 of the smartphone 91a directed to the visible light signal incident port 24 of the personal computer 92.

FIGS. 11 to 13 are examples of use examples of the information terminal according to the present embodiment, and the information terminal of the present embodiment is not limited to these examples. The information terminal may be, for example, a tablet.

Fourth Embodiment

Figure 15:
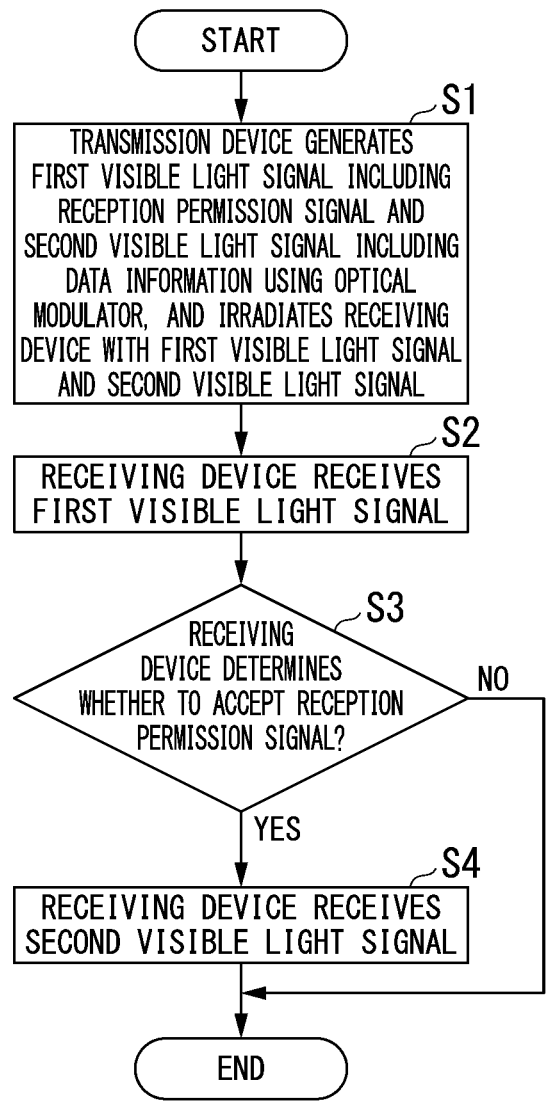
FIG. 15 is a flowchart which describes a communication method according to a fourth embodiment of the present disclosure.

FIG. 15 is a flowchart which describes a communication method according to a fourth embodiment of the present disclosure. In the following description, a communication method of the present embodiment will be described by taking a case of transferring information data from the transmission device 10a of the communication system shown in FIG. 10 to the receiving device 20a as an example.

First, at the beginning, the transmission device 10a generates a first visible light signal including a reception permission signal and a second visible light signal including information data using the optical modulator 12, and irradiates the receiving device 20a with the first visible light signal and the second visible light signal (a process S1). In the process S1, the optical modulator 12 generates a first visible light signal by adding a reception permission signal to visible light, and generates a second visible light signal by adding information data to the visible light. Then, the generated visible light signal 2 is emitted to the external space via the visible light signal exit port 14. The reception permission signal is a signal for confirming that the receiving device 20a is a transmission destination of the information data.

Next, the receiving device 20a receives the first visible light signal (a process S2). The first visible light signal received in the process S2 is converted into an electrical signal by the optical-electric conversion element 22, and the reception permission signal added to the first visible light signal is extracted.

Next, the receiving device 20a determines whether to accept the reception permission signal (a process S3). In the process S3, when it is confirmed by the reception permission signal that the receiving device 20a is a transmission destination of the information data (YES), the reception permission signal is accepted and the procedure proceeds to the next process. On the other hand, when it is confirmed by the reception permission signal that the receiving device 20a is not a transmission destination of the information data (NO), the procedure ends without accepting the reception permission signal and proceeding to a next process.

Next, the receiving device 20a receives the second visible light signal (a process S4). The second visible light signal received in the process S4 is converted into an electrical signal by the optical-electric conversion element 22, and the information data added to the second visible light signal is extracted.

When the receiving device 20a has a transmission means such as a smartphone, the transmission device 10a does not have to perform irradiation with the second visible light signal in the process Si. In this case, in the process S3, when the receiving device 20a accepts the reception permission signal, the receiving device 20a transmits an instruction signal to the transmission device 10a such that it performs irradiation with the second visible light signal, and the transmission device 10a may perform irradiation with the second visible light signal based on the instruction signal. A transmission means when the receiving device 20a transmits the instruction signal to the transmission device 10a may be visible light communication or radio wave communication.

When the receiving device 20a has a display such as a smartphone, a reception completion message may be displayed on the display after the completion of the process S4. Moreover, when a transmission failure occurs, an error message may be displayed on the display. Furthermore, when the receiving device 20a has a transmission means, a reception completion signal may be transmitted to the transmission device 10a after the completion of the process S4. In addition, when a transmission failure occurs, the instruction signal may be transmitted to the transmission device 10a again such that it performs irradiation with the second visible light signal.

According to the communication system described above, when information data is transferred from the transmission device 10a to the receiving device 20a, the transmission destination of the information data is confirmed by visual confirmation of the second visible light signal and confirmation by the reception permission signal. Therefore, it is possible to more reliably prevent erroneous transmission of information data.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Visible light
1A Bright light

1B Dark light
2 Visible light signal
3 Modulated light
10a, 10b Transmission device
11 Laser light source
12, 12a, 12b, 12c, 12S Optical modulator
12d Phase modulation portion
13 Electrical signal generation element
14 Visible light signal exit port
20a, 20b Receiving device
21 Visible light signal receiver
22 Optical-electric conversion element
30, 30S Substrate
40, 40S Optical waveguide layer
41 Optical waveguide
42 Light receiving portion
43 Branch portion
44a, 44aS First branch optical waveguide
44b, 44bS Second branch optical waveguide
45 Coupling portion
46 Visible light signal generation unit
47 Visible light signal emitting unit
48 Flat portion
50, 50S Buffer layer
Ma First insulation layer
51b second insulation layer
60 Electrode layer
61 Signal electrode
61a, 61aS First signal electrode
61b, 61bS Second signal electrode
62 Ground electrode
62a First ground electrode
62b Second ground electrode
62c Third ground electrode
70 Optical fiber
91, 91a, 91b, 91cC, 91d Smartphone
92 Personal computer
100a, 100b Communication system
110 Transmission device
111 Visible light source

What is claimed is:

1. A transmission device configured to transmit a visible light signal to a receiving device, comprising:
   a laser light source configured to emit visible light, the visible light is red light, green light, or blue light each having a different wavelength;
   an optical modulator configured to change intensity of the visible light and generate a visible light signal corresponding to the red light, green light, or blue light; and
   an electrical signal generation element configured to receive information data to be transmitted, and output the information data to the optical modulator,
   wherein the optical modulator has an optical waveguide that serves as a transmission path for the visible light, and an electrode layer that modulates the visible light traveling in the optical waveguide,
   the optical waveguide is formed of a material containing lithium niobate,
   the optical waveguide has a ridge portion and a flat portion,
   a wavelength of the red light is 638 nm,
   a wavelength of the green light is 520 nm,
   a wavelength of the blue light is 473 nm,
   a width of a cross section perpendicular to a transmission direction of the visible light of the ridge portion in the optical waveguide is within a range of 510.4 nm or more and 1182.5 nm or less, and a height of the cross section of the ridge portion is within a range of 510.4 nm or more and 709.5 nm or less,
   the electrical signal generation element is configured to change a voltage value $V\pi$ required to phase-modulate the wavelength of light to half-wavelength applied to the electrode layer by the visible light transmitting through the optical waveguide, and
   an integrated value $V\pi*Li[V*cm]$ which is a product of the voltage value $V\pi$ and an interaction length Li is 1.79 V*cm when the visible light is the red light, is 1.39 V*cm when the visible light is the green light, and is 1.20 V*cm when the visible light is the blue light.

2. The transmission device according to claim 1, wherein the optical modulator has a substrate, and the optical waveguide is a lithium niobate film grown on the substrate.

3. The transmission device according to claim 2, wherein the substrate is a sapphire substrate or an aluminum oxide substrate.

4. The transmission device according to claim 1, further comprising an exit port for emitting the visible light signals to an outside.

5. The transmission device according to claim 1, further comprising a connection unit for connecting to an optical fiber that transmits the visible light signals to an outside.

6. An information terminal comprising a transmission device according to claim 1.

7. The information terminal according to claim 6, wherein the information terminal is a smartphone, a tablet, or a personal computer.

8. A communication system comprising:
   the transmission device according to claim 1; and
   a receiving device configured to receive the visible light signals transmitted by the transmission device.

9. A communication method using the communication system according to claim 8, comprising the steps of:
   generating a first visible light signal including a reception permission signal and a second visible light signal including information data using the optical modulator, and irradiating the receiving device with the first visible light signal and the second visible light signal by the transmission device;
   a process of receiving the first visible light signal by the receiving device; and
   a process of determining whether to accept the reception permission signal or not, and receiving the second visible light signal by the receiving device when the reception permission signal is accepted.

10. The transmission device according to claim 1, wherein the height of the cross section of the ridge portion is within a range of 560 nm or more and 709.5 nm or less.

11. The transmission device according to claim 1,
   the optical waveguide includes a light receiving portion, a branch portion, a first branch optical waveguide, a second branch optical waveguide, a coupling portion, a visible light signal generation unit, and a visible light signal emitting unit,
   the visible light received by the light receiving portion propagates from the light receiving portion to the branch portion, is branched at the branch portion, and propagates to the first branch optical waveguide and the second branch optical waveguide, and the visible light propagating through each of the first branch optical waveguide and the second branch optical waveguide is combined at the coupling portion, becomes the visible light signal in the visible light signal generation unit, and is transmitted to the outside via the visible light signal emitting unit, the electrode layer has a first signal electrode, a second signal electrode, a first ground electrode, a second ground electrode, and a third ground electrode, the first signal electrode faces the first branch optical waveguide, the second signal electrode faces the second branch optical waveguide, the first ground electrode is disposed along the first signal electrode on a side opposite to a second signal electrode side of the first signal electrode, the second ground electrode is disposed along the second signal electrode on a side opposite to a first signal electrode side of the second signal electrode, the third ground electrode is disposed between the first signal electrode and the second signal electrode along the first ground electrode and the second signal electrode the first ground electrode, the second ground electrode, and the third ground electrode are connected by a bonding wire, and the electrical signal generation element applies a potential difference based on the voltage between each of the first signal electrode and the second signal electrode, and the first ground electrode, the second ground electrode, and the third ground electrode, depending on the visible light transmitting through the optical waveguide.

12. The transmission device according to claim 1, the interaction length $L_i$ is more than 1 cm, and the electrical signal generation element applies a voltage of 1.79 V or less to the electrode when the visible light is the red light, 1.39 V or less to the electrode when the visible light is the green light, and 1.20 V or less to the electrode when the visible light is the blue light.

* * * * *